(12) United States Patent
Elwart et al.

(10) Patent No.: US 9,453,910 B2
(45) Date of Patent: Sep. 27, 2016

(54) DETECTING RADAR BLOCKAGE BASED ON DRIVE HISTORY

(71) Applicant: Ford Global Technologies, LLC, Dearborn, MI (US)

(72) Inventors: Shane Elwart, Ypsilanti, MI (US); Aaron L. Mills, Ann Arbor, MI (US); Dorian Jack Spero, Reading, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 245 days.

(21) Appl. No.: 14/259,422

(22) Filed: Apr. 23, 2014

(65) Prior Publication Data

US 2015/0309165 A1    Oct. 29, 2015

(51) Int. Cl.
  *G01S 13/02*    (2006.01)
  *G01S 7/40*     (2006.01)
  *G01S 13/93*    (2006.01)
  *G01S 13/86*    (2006.01)

(52) U.S. Cl.
  CPC .............. *G01S 13/02* (2013.01); *G01S 7/4026* (2013.01); *G01S 13/931* (2013.01); *G01S 13/867* (2013.01); *G01S 2007/4039* (2013.01); *G01S 2013/936* (2013.01); *G01S 2013/9353* (2013.01); *G01S 2013/9357* (2013.01); *G01S 2013/9375* (2013.01); *G01S 2013/9378* (2013.01); *G01S 2013/9385* (2013.01)

(58) Field of Classification Search
  CPC .... G01S 13/02; G01S 13/867; G01S 13/931; G01S 2007/4039; G01S 2013/9353; G01S 2013/9357; G01S 2013/936; G01S 2013/9375; G01S 2013/9378; G01S 2013/9385; G01S 7/4026

USPC .......................................................... 342/61
  See application file for complete search history.

(56) References Cited

U.S. PATENT DOCUMENTS

| | | | |
|---|---|---|---|
| 5,485,159 A | 1/1996 | Zhang et al. | |
| 5,959,570 A | 9/1999 | Russell | |
| 6,469,659 B1 * | 10/2002 | Lajiness | G01S 7/4004 342/159 |
| 6,611,227 B1 | 8/2003 | Nebiyeloul-Kifle et al. | |
| 7,342,532 B1 | 3/2008 | Matsuoka | |
| 2009/0243912 A1 | 10/2009 | Lohmeier et al. | |

FOREIGN PATENT DOCUMENTS

| | | |
|---|---|---|
| JP | 2000321348 A | 11/2000 |
| JP | 2007178310 A | 7/2007 |
| JP | 2009243963 A | 10/2009 |

* cited by examiner

*Primary Examiner* — Timothy A Brainard
(74) *Attorney, Agent, or Firm* — Frank MacKenzie; Brooks Kushman P.C.

(57) ABSTRACT

A vehicle includes a radar sensor for detecting objects in the vehicle path. The radar sensor may become blocked by contaminants or debris. A controller monitoring the radar system may detect a radar blockage when a return signal magnitude is less than a threshold. A typical response may be to set a radar blockage diagnostic under such a condition. The controller may inhibit setting a radar blockage diagnostic when other data indicates that the radar sensor is not blocked. Data such as vehicle position, traffic information, camera images, and historical radar returns may be used. A controller may confirm a radar blockage diagnostic when other data indicates that the radar sensor may be blocked. Data such as temperature, vehicle position, surface roughness, automated brake interventions, and heating system status may be used. Return signal dependent functions may be operated based on the radar blockage diagnostic.

19 Claims, 3 Drawing Sheets

DETECTING RADAR BLOCKAGE BASED ON DRIVE HISTORY

TECHNICAL FIELD

This application generally relates to automotive radar system diagnostics.

BACKGROUND

A vehicle may include a sensor for detecting objects around the vehicle. The sensor may be a radar system that transmits an electromagnetic wave and receives a reflected signal from an object. The relative speed and distance of the object may be detected based on the characteristics of the return signal. In order to operate properly, the radar must be able to transmit and receive the electromagnetic signal. Under some situations, the transmitted and received signals may be attenuated. Debris or obstructions in front of the radar unit may cause attenuation of the radar signals. For example, mud, ice, or snow in front of the radar unit may obstruct the radar function. Under these conditions, the return waves may be so degraded that a low radar return signal is measured. When a low radar return signal is detected, a radar diagnostic system may diagnose a radar fault condition and disable operation of radar related functions.

SUMMARY

A vehicle includes a sensor configured to output a return signal based on a reflected signal from an external object and at least one controller. The at least one controller is configured to, (i) output an unblocked sensor status in response to a magnitude of the return signal being greater than a predetermined value, (ii) output a blocked sensor status in response to the magnitude being less than the predetermined value in a presence of data indicative of conditions in which the magnitude is expected to be greater than the predetermined value, and (iii) output an unconfirmed sensor status in response to the magnitude being less than the predetermined value in the presence of data indicative of conditions in which the magnitude is expected to be less than the predetermined value. The controller may be further programmed to, (i) in response to outputting the unblocked sensor status, operate a function dependent on the return signal in a full operation mode, (ii) in response to outputting the blocked sensor status, operate the function in a disabled mode, and (iii) in response to outputting the unconfirmed sensor status, operate the function in one of a partial operation mode, the full operation mode and the disabled mode. The return signal dependent function may be a collision warning function, and the collision warning function may be operated in the partial operation mode by increasing a threshold for detecting external objects. The magnitude may be expected to be less than the predetermined value when a sparse environment is detected in which the vehicle is operating in an absence of external objects to cause the magnitude of the return signal to be greater than the predetermined value. Data indicative of conditions in which the magnitude is expected to be less than the predetermined value may include one or more of a vehicle position, traffic information, images from a camera, and historical return signal signatures. Data indicative of conditions in which the magnitude is expected to be greater than the predetermined value may include one or more of a temperature, a defroster status, a heater status, a braking control intervention signal, a surface roughness, a braking event indication, images from a camera, and a vehicle position An external object detection system for a vehicle includes a sensor configured to provide a return signal based on a reflected signal from an object and at least one controller. The at least one controller is programmed to output an unconfirmed sensor status in response to conditions indicative of an expected return signal magnitude being less than a predetermined value while an actual return signal magnitude is less than the predetermined value. The at least one controller may be further programmed to receive vehicle location data, and conditions indicative of the expected return signal magnitude being less than the predetermined value may include a historical return signal signature less than the predetermined value at a present vehicle location. The at least one controller may be further programmed to receive traffic information, and conditions indicative of the expected return signal magnitude being less than the predetermined value may include traffic information that indicates a sparse environment at the present vehicle location.

The external object detection system may further include a camera. The at least one controller may be further programmed to receive images from the camera, and conditions indicative of the expected return signal magnitude being less than the predetermined value may include an absence of objects expected to cause the actual return signal magnitude to be greater than the predetermined value in images received from the camera.

The at least one controller is may be further programmed to output a blocked sensor status in response to conditions indicative of a presence of one or more of ice and snow while the actual return signal magnitude is less than the predetermined value. The at least one controller may be further programmed to output a blocked sensor status in response to conditions indicative of the expected return magnitude being greater than the predetermined value while the actual return signal magnitude is less than the predetermined value. The at least one controller may be further programmed to receive brake control intervention information, and conditions indicative of the expected return magnitude being greater than the predetermined value may include an increase in a frequency of brake control intervention events. The at least one controller may be further programmed to receive vehicle location data, and conditions indicative of the expected return magnitude being greater than the predetermined value may include braking events in a historically sparse area based on a vehicle location. The external object detection system may further include a camera. The at least one controller may be further programmed to receive images from the camera, and conditions indicative of the expected return magnitude being greater than the predetermined value may include ice and snow in images received from the camera. The at least one controller may be further programmed to receive surface roughness information, and conditions indicative of the expected return magnitude being greater than the predetermined value may include a change in surface roughness.

A method of detecting an object detection sensor blockage includes receiving a return signal based on a reflected signal from an external object, receiving data indicative of an expected return signal magnitude, and inhibiting, by a controller, a sensor blockage diagnostic indication when an actual return signal magnitude and the expected return signal magnitude are both less than a predetermined value. The method may include outputting the sensor blockage diagnostic when the actual return signal magnitude is less than the predetermined value and the expected return signal magnitude is greater than the predetermined value. The method may include operating return signal dependent functions based on a present status of the sensor blockage diagnostic. The method of may include indicating the sensor blockage diagnostic to an operator.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle 10 includes a powertrain 12 for providing drive torque for propelling the vehicle 10. The powertrain 12 may be an internal combustion engine, an electric drive, or a hybrid-electric unit. Propulsive power may be provided by an internal combustion engine and/or one or more electric machines. The propulsive power may be transferred to drive wheels through a transmission that may be part of the powertrain 12.

Figure 1:
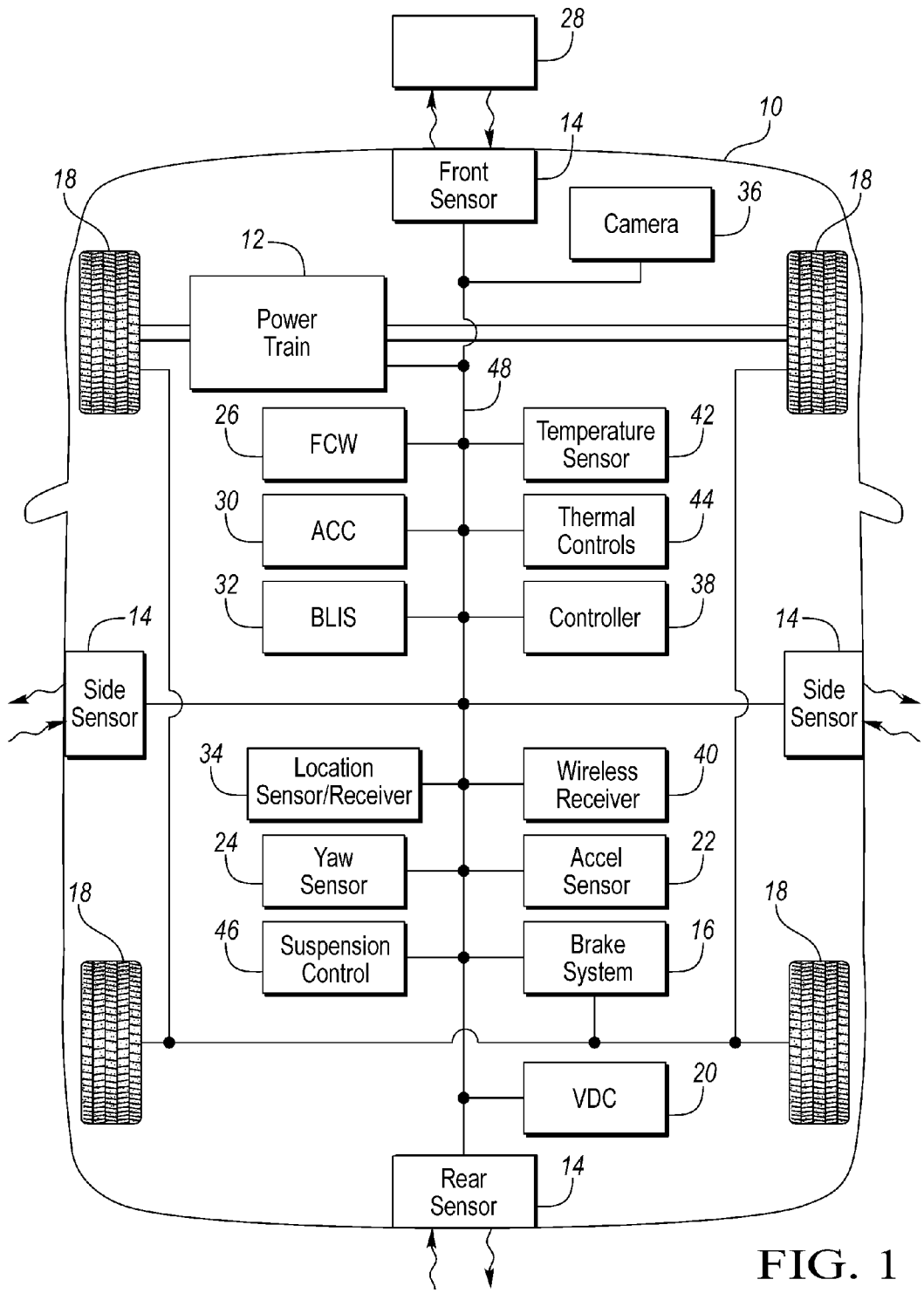
FIG. 1 illustrates a possible vehicle configuration with various functional subsystems including one or more object detection systems.

The vehicle 10 may include one or more systems or sensors 14 for detecting external objects 28 around the vehicle 10. The external object detection sensors 14 may be located at various positions on the vehicle (e.g., front sensor(s), side sensor(s), and rear sensor(s)). FIG. 1 depicts multiple object detection systems or sensors 14 on the front, rear and sides of the vehicle 10. An external object detection sensor 14 may be configured to provide a return signal based on a reflected signal from an external object 28.

Figure 2:
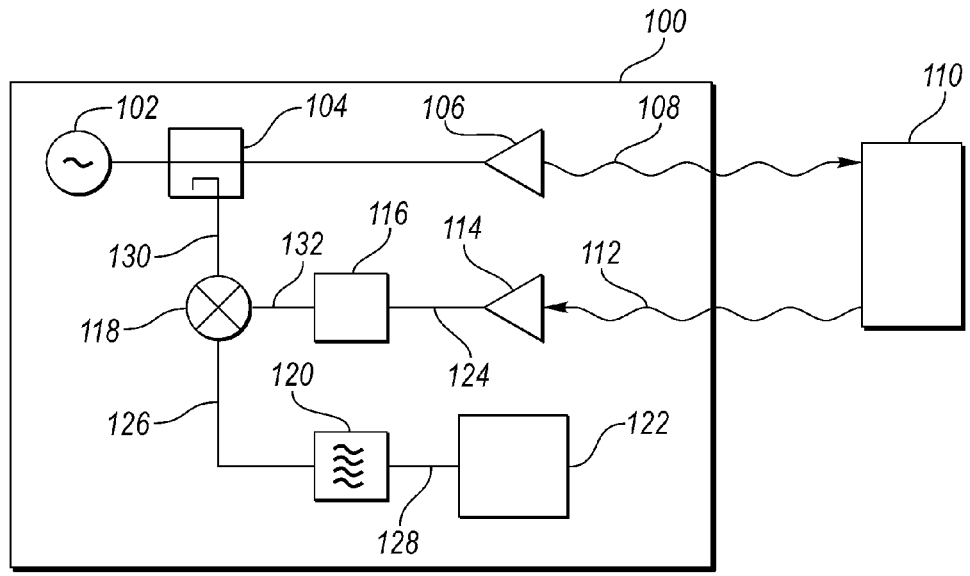
FIG. 2 illustrates a simplified radar system configuration.

The external object detection sensor 14 may be a radar unit. A simplified diagram of a radar unit 100 is depicted in FIG. 2. The radar unit 100 may include an oscillator 102 configured to generate an electrical signal having certain frequency and amplitude characteristics. The signal may be passed through a coupler 104 configured to couple a portion of the transmission power to a receive mixer 118. The electrical signal may be routed to a transmit antenna 106 configured to emit an electromagnetic wave 108. The transmitted wave may be chosen to be a particular frequency (e.g., 77 Ghz, 24 Ghz). The electromagnetic wave 108 may be propagated from the radar unit.

The electromagnetic wave 108 may be reflected from an object 110 in the path of the electromagnetic wave 108. The magnitude, frequency and phase of the reflected electromagnetic wave 112 may depend on a number of factors. These factors include the radar cross section of the reflecting object 110, the power level of the transmitted signal, the distance between the radar 100 and the reflecting object 110, properties of the medium in which the electromagnetic wave travels, and the relative speeds of the radar and the reflecting object 110. The sensor 100 may include a receive antenna 114 to receive the reflected electromagnetic wave 112. The reflected electromagnetic wave 112 may be converted into an electrical signal 124. The electrical signal 124 may be processed by a low noise amplifier 116 configured to amplify the received signal. The amplified signal 132 may be fed into a mixer 118.

The mixer 118 may be configured to down convert the received signal 132 to another frequency range. The radar signals may be high frequency signals and it may be desirable to convert them to lower frequencies for processing. The mixer 118 may remove the transmit frequency from the received signal 132 and leave only the frequency difference between the two signals. The mixer output signal 126 may be a signal having a frequency that represents the speed and distance of the object 110 relative to the radar 100. The mixer output 126 may be passed through a filter stage 120 configured to filter the signal. The filtered signal 128 may be routed to a controller 122.

The controller 122 may be configured to read and process the filtered signal 128. For example, the controller may include an analog-to-digital converter that converts the filtered signal 128 to a digital value. The filtered signal 128 may be sampled at a rate sufficient to capture the expected frequency range of the signal.

The representation shown in FIG. 2 is a simplified radar system. More complex radar systems are possible and the techniques to be described are not limited by the particular radar system. In addition, some components in FIG. 2 may not be present in all applications.

The electrical return signal 124 may vary in magnitude and phase from the signal that was originally transmitted. The frequency and magnitude of the return signal 124 may be analyzed to calculate the distance of the object from the vehicle and the relative speed between the object and the vehicle. The return signal 124 may be affected by the objects 110 or lack of objects in the path of the radar 100. In a situation where there are no objects in the radar path, a weak signal or no signal may be reflected back to the receive antenna. In such a case, the magnitude of the return signal 124 may be less than a threshold value.

The controller 122 may process the radar return signal 128. In order to process the radar return signal, the return signal must be of sufficient magnitude as to be distinguished from noise. The controller 122 may process the return signal 128 to ascertain various objects 110 that are in the vehicle path. The distance to the object 110 and the speed of the object 110 relative to the vehicle may be calculated. The controller 122 may include sufficient non-volatile memory to store historical data received from the radar.

The controller 122 may perform diagnostic functions on the radar system 100. Signals received from the radar unit may be analyzed for plausibility to ensure that signals received are consistent with one another. Signals may be analyzed for electrical problems such as short circuit conditions to ground or power. In the event that a problem is diagnosed, the controller may alter the system operation to respond to the diagnosed condition. A diagnosed problem may cause associated functions to be disabled.

Effective operation of the radar unit 100 may require that the path in front of the radar transmitter 106 and receiver 114 be clear of obstructions. Obstructions may cause attenuation of the transmitted 108 and reflected 112 radar signals. Any debris or obstructions in front of the radar unit 100 may degrade the electromagnetic waves such that the reflected waves no longer represent the actual environment. For example, mud, ice, or snow in front of the radar unit may obstruct the radar function. Under these conditions, the return waves may be so degraded that a measured radar return signal is less than a predetermined threshold. A possible threshold may be a signal level that is smaller than an expected noise signal level such that the return signal may not be ascertained from the noise signal. For example, the return signal 128 when measured by the controller 122 may have a magnitude below a predetermined value. In the case of a blocked radar, it may be appropriate to disable functions that rely on the radar signal. As the radar signal cannot provide acceptable range data, the signal may not be reliable enough for control or notification functions. A diagnostic indicator may be set to alert the driver of the condition.

The radar return signal may be monitored to determine if the radar unit 100 is blocked. The radar diagnostics may determine a blockage based on a magnitude of the radar return signals. It is possible that under some situations a low radar return signal is validly observed. An example may be an environment in which there are no objects in front of the vehicle to reflect the radar signals. In such a sparse environment, false blockage detections may occur. A sparse environment may be an area that has a low radar return. The low radar return may be due to a lack of objects in the vehicle path so that no signal is reflected back to the radar unit 100. When a low radar return signal is detected, the diagnostic function may determine that the radar unit 100 is not functioning. Functions utilizing the radar return signal may then be disabled. A detection of a low radar return signal in a sparse environment may not necessarily be a problem. Since a sparse environment is not expected to generate any radar returns, the detection of a low radar signal in a sparse environment is not a true diagnostic condition. These false detections are undesirable as the module may be fully functional but features are unnecessarily disabled.

It may be desirable to eliminate or reduce the occurrence of false detections due to low radar return signals. An approach to reducing the occurrence of false detections may be to monitor signals other than the radar return signal to detect a sparse environment. To monitor for a sparse environment, outputs from other modules on the vehicle may be utilized. These additional signals may be monitored to determine the sparseness of the vehicle environment. From these other signals, an expected return signal magnitude may be determined. The expected return signal magnitude may be an actual signal level that is expected. The expected return signal magnitude may also be expressed as a binary signal having one state when greater than a predetermined value and another state when less than a predetermined value. A blocked sensor determination may be based on the expected return signal magnitude and the actual return signal magnitude.

Referring again to FIG. 1, the vehicle 10 may include one or more controllers that perform a variety of functions. Each controller may be connected to one or more vehicle communication networks 48. Communication between controllers may be performed via a serial link (Controller Area Network—CAN) or via discrete connections between controllers. In FIG. 1, a signal communication network 48 is depicted. Alternatively, the vehicle communication network 48 may be comprised of multiple smaller networks. The return signal or data derived from the return signal may be used in various systems within the vehicle and may be communicated over the communication network 48. The radar return signal and associated data may be communicated to other controllers.

The vehicle 10 may include a braking system 16 for decelerating the vehicle 10. The braking system 16 may include a brake mechanism at each wheel 18. The braking system 16 may include a module to control brake force at each wheel 18 individually. The braking system 16 may be hydraulic, electrical or a combination thereof. For example, a traditional internal combustion engine powered vehicle may utilize a hydraulic braking system in which the brake force is controlled by modulating fluid pressure within the braking mechanisms. As another example, a hybrid-electric vehicle may include a hydraulic braking system and may also utilize regenerative braking from an electric machine.

A vehicle dynamics control (VDC) 20 feature may interface with the powertrain 12 and braking systems 16 to implement various control features. The VDC system 20 may include an antilock braking function that controls the wheel slip during braking events. The VDC system 20 may include a traction control function that limits wheel slip during acceleration events. The VDC system 20 may include a vehicle stability function that provides directional control based on a desired heading. The VDC system 20 may receive wheel speeds, steering wheel angle, vehicle acceleration/deceleration, lateral acceleration, and yaw rate. An acceleration sensor 22 and a yaw sensor 24 may be interfaced to the VDC 20.

The VDC system 20 may communicate information on the communication network 48. Information provided by the VDC 20 to other modules may include an indication of brake control intervention, engine control intervention, vehicle speed, wheel speeds, acceleration, yaw rate, and brake pedal status.

A forward collision warning (FCW) 26 function may use signals based on the object detection system return signal to warn the driver of a potential collision with the object 28. The FCW 26 may use distance and speed information derived from the return signal to set a warning. The FCW 26 may provide a visual or audible warning when the vehicle 10 is less than a predetermined distance from an object 28 in the vehicle path. The system may interface with the braking system 16 and command the brakes to apply when a potential collision condition is detected to provide a collision mitigation function.

An adaptive cruise control (ACC) 30 function may use signals based on the return signal to control the vehicle 10 at a fixed distance from another vehicle. The return signal may be used to control the powertrain 12 such that the vehicle 10 maintains a fixed speed or a fixed following distance. The distance may be adjusted by commanding the powertrain 12 or the braking system 16 accordingly.

The vehicle 10 may include a blind spot information system (BLIS) 32. The BLIS 32 alerts the driver when other vehicles or objects are in the blind spots of the driver. The blind spots are those areas that are not visible through the mirrors or that are obscured by parts of the vehicle. The BLIS 32 may provide a visual or audible indication of objects located in the blind spot. The BLIS 32 may interface with object detection sensors on the side and rear of the vehicle 10. The BLIS 32 may provide a signal indicating the presence and location of objects next to the vehicle. One location for a visual indicator may be in the side-view mirrors of the vehicle. The BLIS 32 may utilize additional radar or object sensing devices 14.

The vehicle 10 may include a vehicle location sensor or receiver 34 to provide location information to the other systems. For example, the location sensor 34 may be a global positioning system (GPS) that provides the position of the vehicle. The GPS receives signals from satellites and processes the signals to ascertain the position of the GPS receiver. Related to the location sensor 34, the vehicle 10 may include a navigation function that utilizes the location information for navigation and guidance. The navigation function may include a library of maps and route information. The navigation function may include a display for providing feedback of the current location on a map.

The vehicle 10 may include one or more cameras 36 for detecting objects in the path of the vehicle 10. Images from the camera 36 may be processed by a controller 38 to ascertain the presence of objects 28 and the distance of the objects 28 to the vehicle 10. Images generated by the camera 36 may be processed by a controller 38. For example, a camera 36 may be used for a Lane Departure Warning system in which the images are monitored to determine whether the vehicle 10 is maintaining itself within a given lane of the roadway. Camera images may also be used to ascertain the build-up of snow or ice in the vehicle environment. For example, a camera may be mounted within the passenger compartment facing the windshield. The camera images may be processed to detect visibility conditions through the windshield to determine if there is a build-up that may affect visibility.

The vehicle 10 may include one or more wireless receivers 40. The wireless receiver 40 may be a radio system, including AM/FM or satellite. Additionally, the wireless receiver 40 may be cellular data or phone system. The wireless receiver 40 may be capable of receiving traffic and weather information. Traffic information may be data that indicates the traffic density at a present or nearby location. Traffic information may be over a planned vehicle route. Traffic information may include a list of locations at which traffic is moving at speeds below a predetermined speed.

The vehicle may include one or more temperature sensors 42. The temperature sensors 42 may be associated with other functions. Temperature data may be available over the vehicle network communication link 48. The vehicle may include a thermal controls system 44. The thermal controls system 44 may interface with various heating and cooling components of the vehicle. The thermal controls system 44 may control the thermal environment in the passenger cabin. Heating and cooling components may include window defrosters and cabin heating and cooling mechanisms. The thermal controls system 44 may also control heating for a battery and the powertrain. The thermal controls system 44 may communicate defroster and heating/cooling status over the communication network 48.

The vehicle may also include a suspension control system 46. The suspension control system 46 may control the ride height of the vehicle. The suspension control system 46 may provide a suspension height sensor for measuring the deflection of the suspension. Such information may be useful for recognizing the roughness of the road surface. The suspension control system 46 may process suspension data to generate a signal indicative of the surface roughness of the driving surface.

Signals and data from these other vehicle modules may be used to confirm a blocked object detection system sensor. When a low return signal magnitude is detected, other data may be queried to determine if the data is indicative of a blocked or unblocked condition. For example, when the return signal magnitude is below a predetermined threshold, some data may be indicative of a blocked condition, in which case, a sensor blockage should be detected. In other situations, data may be indicative of an unblocked condition, in which case, detection of a sensor blockage condition may be inhibited.

One factor that may be checked is the sparseness of the environment. Sparseness may be considered as a measure of the number of objects available to reflect a signal from the object detection system. One indication of sparseness may be traffic density. In an area of high traffic density, one may expect higher radar return signal magnitudes. An area of low or no traffic density may support an indication of a sparse environment. Traffic density may be ascertained from other modules in the vehicle 10. Traffic density may be inferred using the BLIS 32. An indication of adjacent vehicles on one or both sides of the vehicle 10 may provide a measure of traffic density. An indication of objects to the sides of the vehicle 10 may indicate a higher level of traffic density. In an area of higher traffic density, the expected return signal magnitude may be greater than a low return threshold level.

Real-time traffic information from infrastructure based sensing devices may be utilized to determine sparseness and traffic density. The vehicle 10 may receive a wireless broadcast of traffic density for the region, route or path via the wireless receiver 40. The wireless broadcast may be through radio signals or data via cellular or satellite signals. For example, received broadcast data indicating heavy traffic at the current vehicle location may be used to confirm a diagnostic condition based on a low radar return signal. A low radar return detection while in heavy traffic may indeed be the result of a blocked radar and not a false detection. In a heavy traffic environment, an expected return signal magnitude may be expected to be greater than the low return threshold level.

An on-board camera 36 may also be used to determine sparseness and traffic density. The camera 36 may be forward looking and monitor the area in front of the vehicle 10. Video processing logic may be used to detect objects in the front of the vehicle 10 that correspond to the radar return signals. The camera 36 may send images to a controller 38. Should the controller 38 not detect any objects in front of the vehicle 10 based on the camera images, then the low radar return may be the result of a sparse environment and not a blockage condition.

The performance of the vehicle 10 may be monitored to determine sparseness and traffic density. Repetitive accelerations and decelerations may indicate high traffic density. Yaw changes in the vehicle may indicate maneuvers to avoid objects in the path of the vehicle. Traveling at a high constant speed for long periods of time may indicate a sparse environment or low traffic density. A low radar return signal under this condition may be due to no other vehicles being in the area.

Additional information may be obtained based on vehicle location data and historical radar signatures. Radar signatures may be monitored and stored along with a vehicle location. Over time, a historical signature for particular vehicle locations may be obtained. A historical signature may be a stored return signal magnitude at a given vehicle location. The historical signature may also be an average of a return signal magnitude over a number of times passing through the particular vehicle location. For example, some areas may become associated with a sparse radar signature. While passing this particular position, the current radar signal may be compared to the historical radar signature at the same position. If the current radar signal resembles the historical radar signature, then the radar is likely functioning properly. The radar may be considered to be unblocked where a high radar return signal is present at a vehicle location having a historically low signal. This may indicate that the radar signal is functioning properly.

As another example, the historical radar signatures may indicate that a particular vehicle location is associated with a low radar return signal. That is, the magnitude of the return signal is historically less than a predetermined value at the particular vehicle location. Based on the historical radar signature, one may expect a low radar return signal when passing through this location. In this situation, a diagnostic condition should not be indicated when the actual radar return signal magnitude is below a predetermined value.

Any event that does not include stationary repetitive radar signatures may confirm that the object detection system is unblocked. For example, at a particular vehicle location based on the historical radar signature one may expect a low radar return signal. During a subsequent traverse through the same vehicle location, an event such as a vehicle or animal that causes a significant change from the expected historical radar signature may be used to confirm that the radar is unblocked.

External sources of known radar signatures may be utilized. Radar signatures of particular areas may be developed by driving a test vehicle through the area and storing the results in a database. The database may be loaded into a production vehicle or otherwise communicated as needed and retrieved when the production vehicle passes through the area. A library of base radar signatures may be developed to identify sparse environments in advance. For example, areas that are known to be sparse may be included as part of the information stored for the navigation function.

While some conditions are indicative of an unblocked sensor, other conditions may confirm a blocked radar condition. When external temperatures are near or below the freezing point of water, a radar blockage condition is more likely. Temperature, although not the only factor, may be a leading indicator of a radar blockage. The presence of ice or snow increases the likelihood of a radar blockage. Any data indicative of ice and snow may be used to confirm that a low radar return signal is the result of a blocked sensor.

Other signals based on driver input may indicate the potential of a blocked sensor. The use of defrost or heating mechanisms may suggest a potential sensor blockage. The use of defrosting and heating mechanisms for the vehicle cabin may indicate conditions are present for ice and snow. The system may detect when the defrosting/heating system is operating.

Additionally, an increase of control interventions by the VDC 20 may indicate the presence of ice and snow. The control interventions may include braking interventions and engine interventions. A braking intervention may be an event in which braking force is applied to one or more wheels. An engine intervention may be an event in which engine output is varied. This may include increased usage of the antilock braking function or traction control function. Increased VDC 20 control events may be indicative of ice and snow, which increases the possibility of a radar blockage.

Additionally, an increase in historical road surface roughness may further indicate the presence of snow or ice. The buildup of ice and snow on the roadway may be inconsistent such that the road surface is rougher. The system may monitor vehicle location and inputs relating to road surface roughness. Inputs relating to road surface roughness may be derived from a suspension module that monitors displacement of suspension components. Additionally, the vehicle may include vibration sensors to monitor vibration levels in the vehicle. Surface roughness data may be correlated to a particular vehicle location and stored as historical data.

An on-board camera 36 may be used to detect the presence of ice or snow in the field of view of the device prior to a defrost event. A controller 38 may process images from the camera 36 to determine if ice or snow is present. If the camera 36 indicates the presence of snow, ice or mud, it may be more likely that the radar blockage detection is correct.

Repeated driver initiated braking events in historically sparse regions with low radar return may result in a status of blocked confirmed. The detection may be confirmed using historical radar signals from the location. Vehicle location information may be utilized as well. For example, braking events that occur a large distance from an intersection may be an indication of heavy traffic. A low radar return signal during these conditions may actually indicate a blocked radar and the diagnosis may be confirmed.

Figure 3:
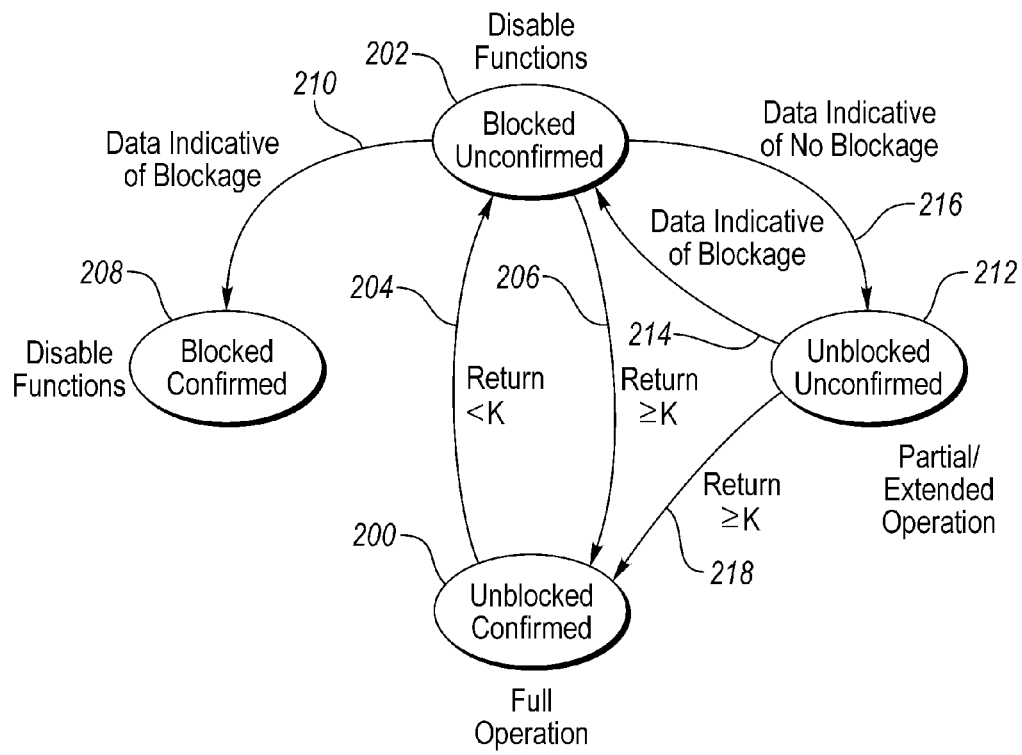
FIG. 3 illustrates a possible state diagram for a diagnostic function for detecting a blockage of an object detection system.

A controller may implement a state machine to monitor the status of a blockage condition. Possible states for the blockage detection may be blocked unconfirmed, blocked confirmed, unblocked unconfirmed, and unblocked confirmed. Each state may have a corresponding mode of operation for the radar system and modules that rely on the radar system. The state of the blockage detection may be output to other functions to inform the functions of the state of the object detection system. FIG. 3 depicts an example of a state diagram for the system described above.

The system may have an unblocked confirmed state 200. The unblocked confirmed state 200 may indicate that the radar return signal is properly functioning. In this state, the system may operate normally. That is, the return signal may be considered to be usable by all functions that are using the return signal. The system may transition from the unblocked confirmed state 200 to a blocked unconfirmed state 202. The unblocked confirmed to blocked unconfirmed transition criteria 204 may be that the return signal magnitude is less than a predetermined threshold (denoted as K in FIG. 3).

The blocked unconfirmed state 202 may indicate that a low return signal is present but that a blocked sensor has not been definitively confirmed. The blocked unconfirmed state 202 may transition back to the unblocked confirmed state 200 when certain blocked confirmed to unblocked confirmed transition criteria 206 are met. The blocked confirmed to unblocked confirmed transition criteria 206 may be that the return signal magnitude is greater than or equal to the predetermined value. Alternatively, some hysteresis may be added to the predetermined value such that the transition 206 occurs when the return signal is greater than the sum of the predetermined value and the hysteresis value. The hysteresis prevents the state from rapidly alternating when the return signal is near the predetermined value.

The system may operate in a disabled mode while in the blocked unconfirmed state 202. The disabled mode of operation may be temporary until the status of the object detection system is finally confirmed. The controller may output the status of the return signal to other modules and functions. The other modules and functions may use this status to modify operational thresholds or modes of operation. The indication of the blocked unconfirmed state 202 may act as a warning to other modules that a blocked sensor condition is suspected but not yet confirmed.

The blocked unconfirmed state 202 may transition to a blocked confirmed state 208. The blocked unconfirmed to blocked confirmed transition criteria 210 may be the presence of data indicative of conditions in which the return signal magnitude is expected to be above the predetermined value. That is, conditions are present that support the identification of a blocked sensor. Any of the criteria discussed above relating to supporting a blocked sensor diagnosis may be applied. In the blocked confirmed state 208, the system may operate in the disabled mode and disable any functionality associated with the return signal. Modules and functions relying on the return signal may be disabled. A diagnostic indication may be stored in retained memory and a diagnostic indicator may be operated to alert the driver.

The blocked unconfirmed state 202 may also transition to an unblocked unconfirmed state 212. The blocked unconfirmed to unblocked unconfirmed transition criteria 216 may be the presence of data indicative of conditions in which the return signal magnitude is expected to be less than the predetermined value. That is, conditions are present that do not support the detection of blocked sensor. Any of the criteria discussed above relating to supporting an unblocked sensor diagnosis may be applied. As an example, vehicle operation in a location with historically low return signals (e.g., expected return signal magnitude less than a predetermined threshold) while the actual return signal magnitude is below the predetermined threshold may support an unblocked sensor determination. Operation in the unblocked unconfirmed state 212 may be in a partial/extended mode operation. Modules and functions may remain operational with modified performance until the sensor blockage can be finally ascertained. In the partial mode of operation, some functions may be inhibited. For example, an ACC function may be inhibited when a blocked sensor is suspected. As another example, an FCW function may remain operation but require a higher threshold to detect objects.

The unblocked unconfirmed state 212 may transition to the unblocked confirmed state 200. The unblocked unconfirmed to unblocked confirmed transition criteria 218 may be that the return signal magnitude is greater than the predetermined value. The measurement of a return signal magnitude above the predetermined value may indicate that the radar system is functioning. The unblocked unconfirmed state 212 may also transition back to the blocked unconfirmed state 202. The unblocked unconfirmed to blocked unconfirmed transition criteria 214 may be the detection of data indicative of a blockage.

Note that the detection system described depends on the actual radar return signal magnitude being less than a predetermined threshold. Other radar systems may have different methods of detecting a blocked radar sensor. The detection system is easily extendible to these types of systems. The detection may be inhibited when a blocked sensor is suspected and other inputs indicate that the sensor is expected to return a signal as if blocked. Likewise, the confirming inputs can be used to detect conditions in which a blocked sensor reading may be confirmed.

Figure 4:
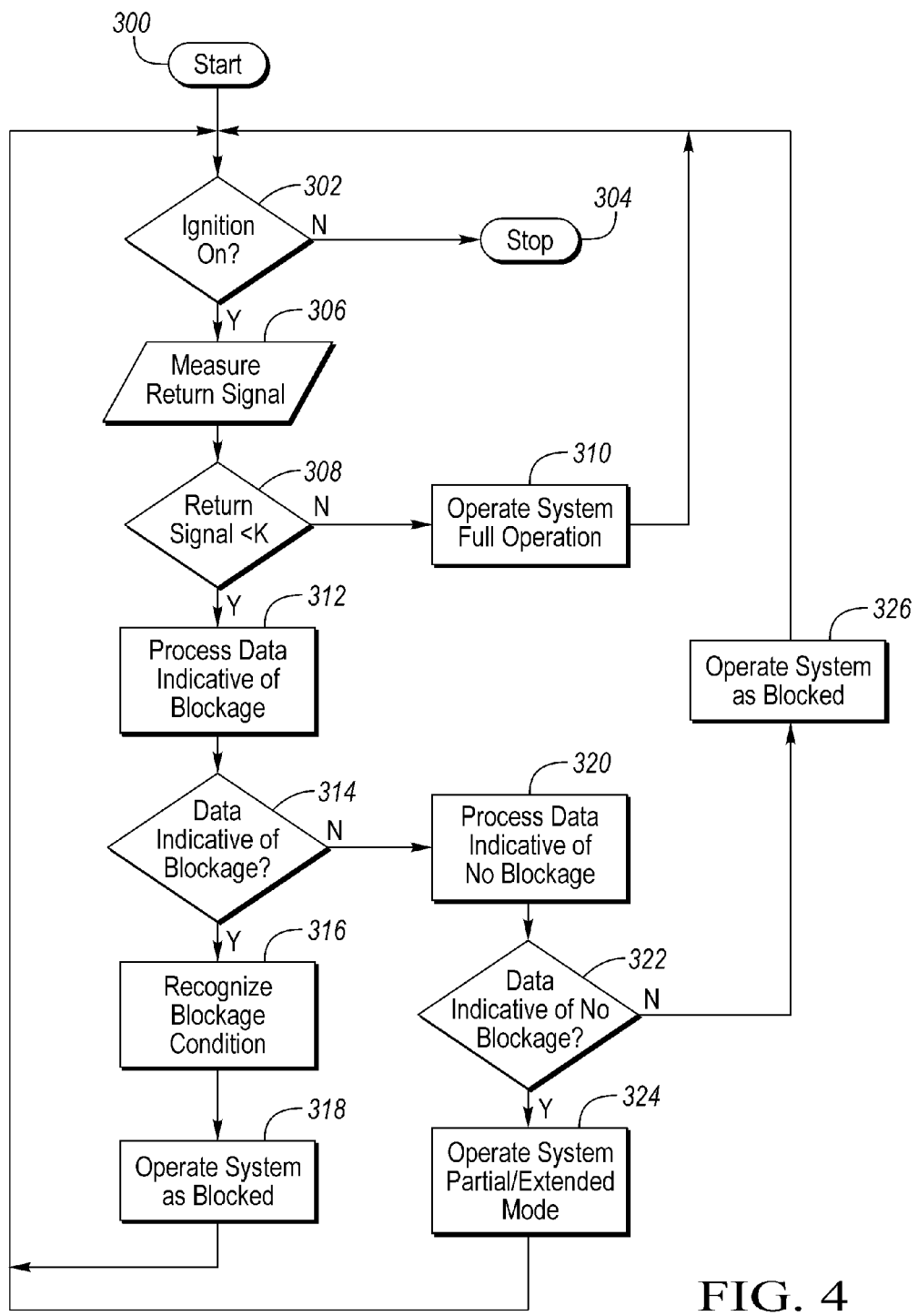
FIG. 4 is a flowchart depicting possible steps for a diagnostic function for detecting a blockage of an object detection system.

The above described system may be implemented in a microprocessor-based controller. FIG. 4 depicts a flowchart of a possible implementation of the method described. After starting 300, the controller may detect if the ignition is on 302. An ignition on condition implies that the vehicle may be operational and ready to drive. If the ignition is not in the on position, the system may stop 304. If the ignition is in the on position, then the system may begin to measure the return signal of the object detection system 306. Next, the controller may compare the return signal magnitude to a threshold 308. If the return signal magnitude is greater than or equal to the threshold, then the return signal may be operational and return signal dependent functions may be operated in a full operation mode 310.

If the return signal magnitude is less than the threshold, then there may be a possibility of a blocked sensor. The controller may then process data indicative of a blockage condition 312. Data indicative of a blockage condition includes those conditions in which an expected return signal magnitude is greater than or equal to the threshold. The controller may then ascertain if the data is indicative of a blockage condition 314. If the data is indicative of a blockage condition, then the controller may recognize the blockage condition 316. Recognition of a blockage condition may include setting a diagnostic trouble code and indicating the condition to the operator. The controller may then operate return signal dependent functions in a disabled mode to prevent operation of components with invalid return signal inputs.

If the data does not support a confirmation of the blockage condition, then the controller may further process data that may be indicative of no blockage 320. Data indicative of no blockage may include those conditions in which the expected return signal magnitude is less than the threshold. The controller may then ascertain if the data is indicative of an unblocked condition 322. If the data is indicative of an unblocked condition, then the system may operate in a partial or extended mode of operation 324. This may be necessary as the sensor is suspected to be unblocked but cannot be confirmed until a return signal greater than the threshold is detected. The partial or extended mode of operation may include operating certain functions in one of a disabled mode, a full operation mode and a limited operation mode. For example, an adaptive cruise control function may be disabled when the sensor is suspected to be unblocked but unconfirmed. A collision warning function may be operated with increased detection thresholds to reduce sensitivity. In addition, a partial or extended mode of operation may be communicated to the operator via a warning lamp or message display.

If the data is not indicative of an unblocked condition, then the system may operate the return signal based functions as if the sensor is blocked 326. This may cover the case where the data is inconclusive as to confirming a blockage or suspecting no blockage. In this situation, functions dependent on the return signal may be disabled until conditions have changed. The operator may be alerted to the disabled condition via a warning lamp or a message display.

The controller may continually iterate through the steps to continually measure and verify the status of the return signal. The controller may also save the operational status of the return signal in non-volatile memory so that the status may be recalled in a subsequent ignition cycle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a sensor configured to output a return signal based on a reflected signal from an external object; and
at least one controller configured to, (i) output an unblocked confirmed sensor status in response to a magnitude of the return signal being greater than a predetermined value, (ii) output a blocked confirmed sensor status in response to the magnitude being less than the predetermined value in a presence of data indicative of conditions in which the magnitude is expected to be greater than the predetermined value, and (iii) output an unblocked unconfirmed sensor status in response to the magnitude being less than the predetermined value in the presence of data indicative of conditions in which the magnitude is expected to be less than the predetermined value.

2. The vehicle of claim 1 wherein the at least one controller is further programmed to, (i) in response to outputting the unblocked confirmed sensor status, operate a function dependent on the return signal in a full operation mode, (ii) in response to outputting the blocked confirmed sensor status, operate the function in a disabled mode, and (iii) in response to outputting the unblocked unconfirmed sensor status, operate the function in one of a partial operation mode, the full operation mode and the disabled mode.

3. The vehicle of claim 2 wherein the function is a collision warning function, and wherein the collision warning function is operated in the partial operation mode by increasing a detection threshold for external objects.

4. The vehicle of claim 1 wherein the magnitude is expected to be less than the predetermined value when a sparse environment is detected in which the vehicle is operating in an absence of external objects to cause the magnitude of the return signal to be greater than the predetermined value.

5. The vehicle of claim 4 wherein data indicative of conditions in which the magnitude is expected to be less than the predetermined value includes one or more of a vehicle position, traffic information, images from a camera, and historical return signal signatures.

6. The vehicle of claim 1 wherein of data indicative of conditions in which the magnitude is expected to be greater than the predetermined value includes one or more of a temperature, a defroster status, a heater status, a braking control intervention signal, a surface roughness, a braking event indication, images from a camera, and a vehicle position.

7. An external object detection system for a vehicle comprising:
a sensor configured to provide a return signal based on a reflected signal from an object; and
at least one controller programmed to output an unblocked unconfirmed sensor status in response to conditions indicative of an expected return signal magnitude being less than a predetermined value while an actual return signal magnitude is less than the predetermined value.

8. The external object detection system of claim 7 wherein the at least one controller is further programmed to receive vehicle location data, and wherein conditions indicative of the expected return signal magnitude being less than the predetermined value includes a historical return signal signature less than the predetermined value at a present vehicle location.

9. The external object detection system of claim 8 wherein the at least one controller is further programmed to receive traffic information, and wherein conditions indicative of the expected return signal magnitude being less than the predetermined value includes traffic information that indicates a sparse environment at the present vehicle location.

10. The external object detection system of claim 7 further comprising a camera, and wherein the at least one controller is further programmed to receive images from the camera, and wherein conditions indicative of the expected return signal magnitude being less than the predetermined value includes an absence of objects expected to cause the actual return signal magnitude to be greater than the predetermined value in images received from the camera.

11. The external object detection system of claim 7 wherein the at least one controller is further programmed to output a blocked confirmed sensor status in response to conditions indicative of a presence of one or more of ice and snow while the actual return signal magnitude is less than the predetermined value.

12. The external object detection system of claim 7 wherein the at least one controller is further programmed to output a blocked confirmed sensor status in response to conditions indicative of the expected return magnitude being greater than the predetermined value while the actual return signal magnitude is less than the predetermined value.

13. The external object detection system of claim 12 wherein the at least one controller is further programmed to receive brake control intervention information, and wherein conditions indicative of the expected return magnitude being greater than the predetermined value includes an increase in a frequency of brake control intervention events.

14. The external object detection system of claim 12 wherein the at least one controller is further programmed to receive vehicle location data, and wherein conditions indicative of the expected return magnitude being greater than the predetermined value includes braking events in a historically sparse area based on a vehicle location.

15. The external object detection system of claim 12 further comprising a camera, and wherein the at least one controller is further programmed to receive images from the camera, wherein conditions indicative of the expected return magnitude being greater than the predetermined value includes ice and snow in images received from the camera.

16. The external object detection system of claim 12 wherein the at least one controller is further programmed to receive surface roughness information, wherein conditions indicative of the expected return magnitude being greater than the predetermined value includes a change in surface roughness.

17. A method of detecting an object detection sensor blockage comprising:

receiving a return signal based on a reflected signal from an external object;

receiving data indicative of an expected return signal magnitude;

inhibiting, by a controller, a sensor blockage diagnostic indication in response to an actual return signal magnitude and the expected return signal magnitude both being less than a predetermined value; and outputting, by the controller, the sensor blockage diagnostic indication in response to the actual return signal magnitude being less than the predetermined value and the expected return signal magnitude being greater than the predetermined value.

18. The method of claim 17 further comprising operating return signal dependent functions based on a present status of the sensor blockage diagnostic.

19. The method of claim 17 further comprising indicating the sensor blockage diagnostic to an operator.

* * * * *